March 17, 1964 R. C. LARSON 3,125,292
HEATING AND COOLING PLANT CONTROL SYSTEM AND VALVES THEREFOR
Filed July 17, 1962 2 Sheets-Sheet 1

INVENTOR
Richard C. Larson

BY Mason, Fenwick & Lawrence
ATTORNEYS

March 17, 1964
R. C. LARSON
3,125,292
HEATING AND COOLING PLANT CONTROL SYSTEM AND VALVES THEREFOR
Filed July 17, 1962
2 Sheets-Sheet 2
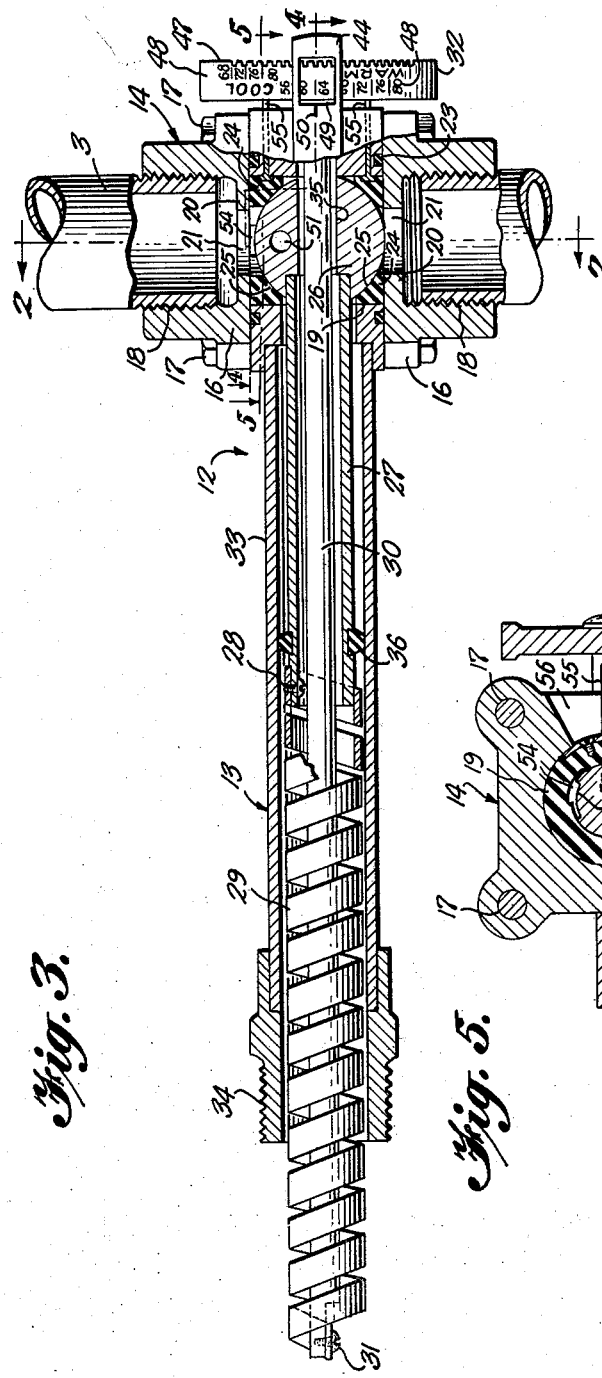
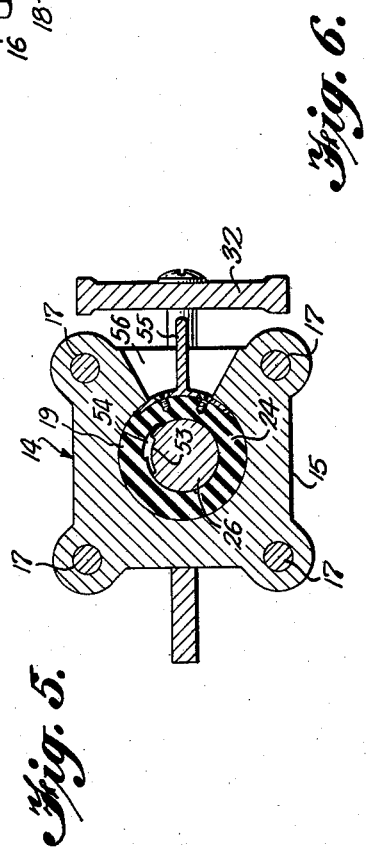
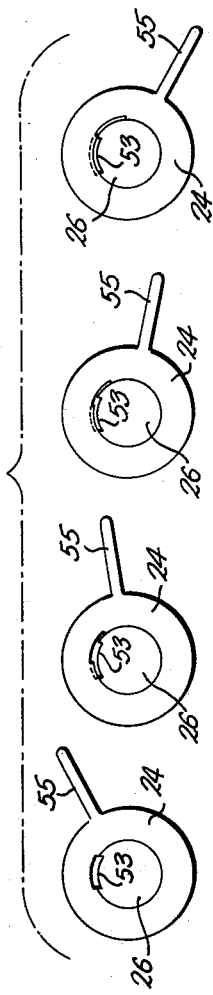
INVENTOR
*Richard C. Larson*
BY *Mason, Fenwick & Lawrence*
ATTORNEYS

United States Patent Office 3,125,292
Patented Mar. 17, 1964

3,125,292
HEATING AND COOLING PLANT CONTROL
SYSTEM AND VALVES THEREFOR
Richard C. Larson, 4420 Great Oak Road, Rockville, Md.
Filed July 17, 1962, Ser. No. 210,438
4 Claims. (Cl. 236—1)

This invention relates to control systems for hot water or steam heating plants, and air conditioning units, and to automatic valves for use therein.

In most small building heating systems and cooling systems, such as used in homes, for example, the boiler heating unit and cooling unit is directly controlled from one, or more, room thermostats in direct accordance with conditions in the area containing the thermostat. Many times, this fails to provide satisfactory temperature throughout the building, due to extreme outside temperatures or differing conditions and requirements in different parts of the building. Some tests have been made, and some equipment is available, for controlling the boiler and the cooler by thermostatic means located inside and outside the building, so that normal operation is modified in accordance with temperature conditions outside. This compensates for outside temperatures, but does not provide for automatic control of temperatures in all parts of the building being served.

It is the general object of the present invention to provide a control system for heating plants and cooling units wherein the boiler and cooler is controlled in accordance with outside temperature and the circulating water, steam, or coolant, as the case may be, is controlled automatically at each radiator in accordance with room requirements.

A more specific object is to provide a valve for radiators having improved temperature responsive control means.

A further object is the provision of an improved automatic valve having temperature responsive control means which is non-electric.

Another object is the provision of an improved automatic valve having temperature responsive control means which can be dialed for either a heating cycle or a cooling cycle.

Still another object of the invention is to provide a non-electric control valve responsive to temperature changes, which can be pre-set to be responsive at selected temperatures to open and close, which setting can be quickly changed when desired.

It is also an object to provide a valve having improved orifice arrangement.

Yet another object is to provide an automatic, temperature responsive valve having means for changing the limits of its modulation capacity.

Other objects of the invention will become apparent from the following description of one practical embodiment thereof, when taken in conjunction with the drawings which accompany, and form part of, this specification.

In the drawings:

FIGURE 3 is a longitudinal section through the radiator control valve, and is taken on the line 3—3 of FIGURE 2;

FIGURE 5 is a horizontal section taken on the line 5—5 of FIGURE 3; and

FIGURE 6 illustrates diagrammatically several settings of the valve to control modulation range, or capacity.

In general, the invention contemplates the provision of outside air temperature responsive means to control the action of the boiler in a hot water, or steam, heating system, and energy input in an absorption or compression cooler unit with independent valve control means at each radiator in the system, which valve control means is responsive to air and radiator temperatures. The valve is an improved valve of the rotary type and is controlled by thermally responsive mechanical means, and can be pre-set to open and close the valve at predetermined temperatures and in predetermined amounts. The action of the valve is not a step-by-step operation, or a simple open and close arrangement, but one wherein the valve opens and closes by continuous progression.

Figure 1:
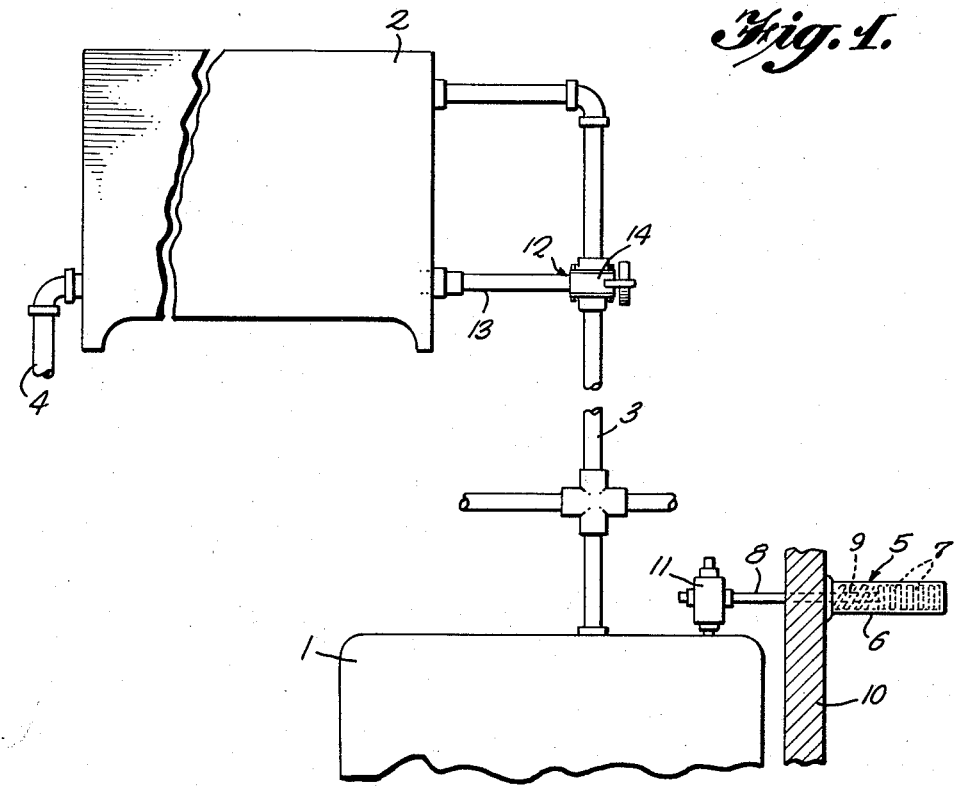
FIGURE 1 is a somewhat schematic view illustrating the control system of the present invention as applied to a hot water, or steam, heating system and cooling system including a boiler and at least one radiator.
Figure 2:
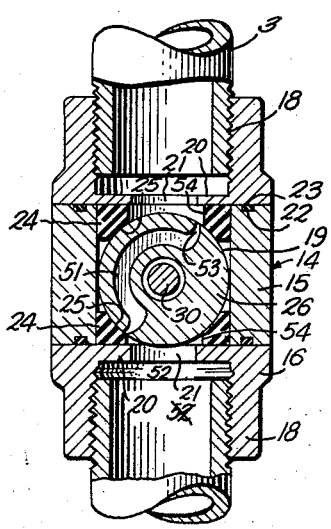
FIGURE 2 is a vertical, transverse section through a radiator control valve, taken on the line 2—2 of FIGURE 1.
Figure 4:
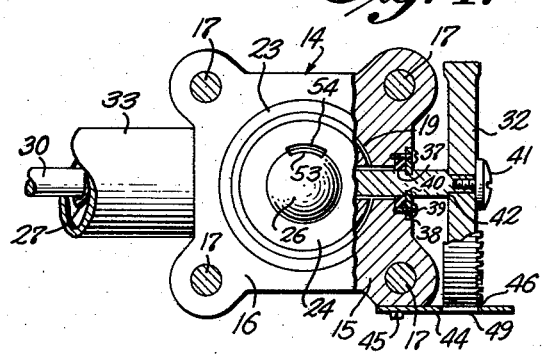
FIGURE 4 is a horizontal section taken on the line 4—4 of FIGURE 3.

Referring to the drawings in detail, and first adverting to FIGURE 1, there is shown a combination heating and cooling system which includes a boiler and cooler 1, which may be electrical, or gas, or oil fired, one or more radiators 2 of standard type, and a piping system having pipes 3 leading from the boiler to the radiators, and the return lines 4. The system may operate with hot water or steam and liquid coolant.

The boiler and cooler operation is controlled by means of a temperature responsive device 5, which may take the form of a casing 6 having a pile of bi-metal thermostatic disks 7 connected to a control rod 8 and loaded by a spring 9. This control is mounted outside the building wall 10 so that it is subjected to outside temperature only. The control rod 8 has its other end connected to an adjustment arm of an adjustable boiler and cooler energy input control element 11. Changes in outside temperature will cause the disks 7 of the pile to flex resulting in a push-pull operation of rod 8 and adjustment of the control unit 11. Thus, the boiler operation and cooler operation will be a function of outside temperature.

The baseboard radiator 2 shown in merely illustrative of any conventional type. Irrespective of the type of radiator used, it will be controlled by a valve 12, interposed in the line feeding the radiator. The valve will be automatically controlled, and will have its control body 13 inserted partially into the radiator and partially exposed to circulating room air. Thus, the valve will operate as required by changes in room air temperature, radiator temperature, or both.

With the system just described, and considering the heating cycle using steam, the boiler will function to maintain boiler pressure at that degree predetermined for the particular outside temperature.

Steam, at desired pressure will be available at each radiator and will be admitted to the radiators in the system in accordance with the particular requirements of the areas which the respective radiators are to serve. Thus, outside temperature determines the pressure of the steam supply, and the room requirements determine the amount of the steam used in each room, or area.

The valves 12, which control the radiators are of special construction. Each includes a valve body 14 and a control body 13 which projects outwardly from the valve body.

The valve body 14 has a three-part housing comprising a hollow central member 15 and cap plates 16 on opposite ends of the central member. Bolts 17 hold the housing elements together. Each of the caps has an internally threaded boss 18 to permit connecting the valve body in the heating system line, so that the heating fluid will flow through the housing when the valve is open. The central member has a cylindrical inner chamber 19 through its full height, and the caps have inwardly directed annular flanges 20 which overlie the peripheral portions of the chamber 19 in the central member. The annular flanges 20 of the caps define openings 21 centrally of the valve body which provides passages to and from the chamber 19 through the pipes threaded in the cap bosses. The openings 21, the threaded bosses 18 and the chamber 19 are in coaxial relation. The central member may be rabbeted around its opposite inner edges to provide ledges 22 to receive sealing gaskets 23 against which the cap members bear to prevent seepage of steam between the central member and cap plates.

Valve seats 24 are fitted within the ends of the chamber 19 and rest against the overhanging flanges of the cap plates. It is contemplated that the valve seats will be self-lubricating plastic rings, of material such as Teflon. The inner edges of the rings are provided with inclined seating surfaces 25 of spherical curvature to seat a valve ball 26. The valve ball and the seats and their particular structure will be described later. The length of the chamber 19 in the central member is such that when the ball is in place, the valve seats in engagement with the ball, and the cap plates in position, the ball will be firmly held against the spherical seats, yet free to adjust itself to the seats and rotate about its horizontal axis.

The ball is fixed to one end of tube 27, the other end being attached, as at 28, to a helically wound, bi-metallic, thermostatic element 29 which is attached in turn to the outermost end of stem 30, as at 31. Stem 30 carries temperature setting wheel 32 at its other end.

Tube 27 and element 29 extend coaxially through a tubular casing 33 which is carried by the central member 15 and forms the housing for the control body 13 of the valve. The free end of casing 33 is open and threaded, as at 34, so that it can be screwed into a radiator. Element 29 and stem 30 extend beyond the open end of casing 33 to project into the condensate space within the radiator. Ball 26 has a diametrical bore 35 of sufficient diameter to permit the free passage of stem 30. Ball 26, tube 27, element 29 and stem 30 rotate about a common axis which is the longitudinal axis of casing 33 and central member 15. Their alignment is fixed by means of valve seats 24 and ring gaskets 36 and 37. The two-piece retainer ring 38 which is fixed to the central member by studs 39 houses gasket 37 and fits peripheral groove 40 on stem 30 locking stem 30 into position but allowing its rotational motion with respect to casing 33.

Wheel 32 is fixed on stem 30 by means of stud 41 which threads into the tapped end of stem 30 and holds the wheel against peripheral shoulder 42 on the stem end. When stud 41 is loosened, stem 30 can be rotated by means of a round bar inserted in hole 43 which is drilled through stem 30 while wheel 32 remains locked in a stationary position, permitting temperature calibration of element 29 and the wheel scale.

When stud 41 is in place and wheel 32 is freed by outward flexing spring arm 44, the operating temperature of valve 12 can be chosen by turning wheel 32 into position. Spring arm 44 which is fixed to member 15 by bolts 15, carries a pin 46 which, when the arm is in unflexed position, engages one of the perimeter flutes 47 of wheel 32 and locks the wheel. The wheel is marked with a suitable temperature scale 48 which can be viewed through window 49 in arms 44 for setting in conjunction with a datum mark 50 on the spring arm.

The ball 26 has a passage 51 which terminates at right angles to the bore 35 to provide a path for steam through the valve when the ball is rotated so that the ends of the passage are aligned with the openings 21 in the cap plates 16. The passage 51 terminates at the outer surface of ball 26 in entrance and exit ports 52 and 53 of particular configuration. These ports have the shape of a curved spherical polygon of two short sides and two long sides, and have a surface cross-sectional area equal to the right cross-sectional area of passage 51. The length of each short side of the polygon is the longest length of arc that a point on the surface of ball 26 travels when element 29 undergoes a predetermined temperature change, four degrees Fahrenheit, for example. The ball-surface-contoured path of each long side is generated by two radii and is of sufficient length to satisfy the area requirement. One of the radii is the radius of ball 26 having its fixed or pivot end at the center of ball 26. The other radii is the radius of the minimum and innermost circular part or plane of valve seat 24 having its fixed or pivot end at the center of the circular part or plane when the valve seat is in position on ball 26.

The two spherical polygonical ports 52 and 53 are positioned on ball 26 diametrically opposite each other and so that the tangent at the mid-section of each long side will be parallel to the axis of rotation of ball 26. This provides for the passage of steam through the valve when the ball is rotated so that these ports are in communication with, or partly with, the openings 21 in the cap plates.

The construction and calibration of bi-metallic thermostatic element 29, ball 26, temperature setting wheel 32 and its scale 48 are such that when element 29 is held constant temperaturewise to any temperature appearing on scale 48 through window 49 aligned with datum mark 50; ports 52 and 53 on the surface of ball 26 will be half covered by valve seats 24.

In mounting the valve, the threaded end 34 of casing 33 is screwed into the radiator so that the interior of the casing is in communication with the fluid in the radiator, but, more importantly, so that the exposed end of the helical bi-metallic thermostatic element 29 lies within the condensate in the body of the radiator. Then steam pipes 3 are connected to threaded fittings 18 of valve cap plates so that the flow of steam to the radiator is through the valve.

When the system is to be used, wheel 32 will be turned to the scale setting indicated for the desired room temperature. Such movement will cause rotation of stem 30 and, through the stem, the helical thermostat, the tube and the valve ball. Thus, setting the wheel will in turn set the position of valve ports 52 and 53 in relation to the edges of valve seats 24.

Assuming that the system is in operation and the room temperature is at the desired level; the temperature of the element ports 29 will be at room temperature, the valve will be in mean operating position, and valves 52 and 53 will have their areas reduced one half by valve seats 24 for the ports will be in mean operating position. The valve is now operating in low-level linear steam-quantity modulation.

The ball 26 responds instantaneously to changes in helical temperature by both clockwise and counterclockwise rotational increments since the helix is in a temperature tensed condition, its outer end is fixed, and there is no compliance between its inner end and ball 26. The depth of modulation is plus and minus two degrees Fahrenheit as the short sides of ports 52 and 53 were measured on the surface of ball 26 by a four degree temperature difference rotation of element 29. Beyond modulation in the valve ball openings are either biased beyond cutoff (room too warm) or biased beyond full openness (room too cold). The self-contained modulation of the valve keeps the room at the desired temperature in the absence of disturbances.

In a disturbance such as an outside temperature drop, two significant things happen. First, the boiler pressure will rise as the temperature responsive device 5 outside the building wall adjusts to the cooler air and changes the boiler pressure controller 11 setting. The heat potential of the system will now be higher, and this, in effect resizes valve 12 to fit the now higher heat loss of the room. Second, the mean operation position of the valve is disturbed by the increased heat loss of the room due to the outside temperature drop. As the room and radiator temperatures fall, the bi-metallic element 29 will be affected both by direct contact with the radiator condensate and by flow of room air across casing 33. This will cause winding movement of the helix which imparts rotative movement to ball 26. The long narrow ports 52 and 53 of the ball move across the valve seat edges to bias the valve to a more open position and an increased quantity of steam will flow through the valve to the radiator and warm the room. As the room temperature rises, the rotative movement imparted to ball 26 becomes slower, stops and reacts in reverse to lessen the steam flow and thus will move into the mean operating position again and become modulating under the increased boiler pressure with the rom at the desired temperature. Now assume that the system is in operation and it is desired to raise the temperature of the room. Wheel 32 is re-set which will bias the port openings of ball 26 beyond full openness. Port exits 52 and 53 will be out towards the center of valve cap openings 21 and full steam flow through the valve and radiators warms the room, the radiator and the bi-metallic thermostatic element 29. This generates winding movement at the inner end of the element 29 and rotates the ball 26 back into its mean operating position just as the room reaches the re-set temperature. The operation is in reverse when it is desired to lower the room temperature.

At any time desired the valve can be manually pre-set to obtain a particular room temperature. The pre-set changes the relative position of the ball orifice with respect to the valve seat so that when the thermal element reaches the chosen temperature the ball orifice middles and is between the close (no flow) position and the open (full flow) position.

The cooling cycle, using a liquid coolant in an absorption or a compression type system will operate the same as the heating cycle except that when a number on the cool section of scale 48 is aligned with datum marker 50, stem 30, element 29, and ball 26 rotate about 60° swinging port exits 52 and 53 of ball 26 across openings 21 to the diametrically opposite edges of valve seats 24. And now, when element 29 increases in temperature ball 26 rotates to increase the flow of fluid through the valve. And now, as element 29 becomes cooler the flow of fluid through the valve decreases. So the valve reverses its action when wheel 32 is turned from the warm scale to the cool scale and vice versa. Rod 8, when driven inward sufficiently by high outside temperatures, will switch the system from the heating cycle to the cooling cycle; and, when allowed to move outward far enough by cold outside temperatures, will switch the system from the cooling cycle to the heating cycle.

With the system as described, a supply of heating or cooling fluid will be available at each radiator in accordance with the needs as dictated by outside temperatures. Each individual radiator will be controlled automatically in accordance with the needs of the area it serves to draw from the fluid supply. Any individual radiator may be re-set at any time as desired. The radiator valves, being actuated by radiator temperature as modified by room air temperature will react to maintain the room temperature at the desired temperature.

The above operations take place when the ports 52 and 53 are working in cooperation with the arcuate inner edges of the valve seats. The valve capacity can be varied, however, by providing the valve seats with ports 54 in their inner arcuate edges, which ports can be moved to extreme positions of full communication with ball ports 52 and 53 and out of communication with these ports, and to various positions therebetween. The setting of the ball must also be altered slightly to achieve the desired results, as will be explained.

Ports 54 are arcuate, the arc being concentric to the opening in the valve seats. The port width is equal to the long width of ports 52 and 53, and the port depth is one-half the narrow width of ports 52 and 53.

The ports 54 are shifted into and out of the path of movement of ball ports 52 and 53 by rotating the valve seats. To this end, operating levers 55 are fixed to the valve seats and project through slots 56 in the central member of the valve body to the outside where they are convenient for manipulation. Slots 56 are of sufficient arcuate extent to permit the necessary angular adjustment of the operating levers to give the ports the movement set out above.

With this arrangement, the widthwise extent, and consequently the open area, of the ball port can be varied considerably for the same two degree arcuate movement of the ball. For example, the diagram at the left of FIGURE 6 shows the port 54 in full registry with ball port 53, and two degrees of rotation of the ball will change the open area of the port 53 from full size to half size. With the valve seat turned so that the port 54 is fully out of the path of movement of the ball port, as seen in the diagram at the right of FIGURE 6, the same arcuate movement of the ball will vary its port opening from one-half exposure to fully closed. The two diagrams at the center of FIGURE 6 show intermediate settings of the valve seat port.

This structure permits a wide variation in the valve modulation capacity and adapts the valve to varied conditions.

By having the ports in the two valve seats in vertical alignment when their operating levers are at similar positions of adjustment, the same variations can be had whether the system is operating to heat or to cool. While the ball port 53 will cooperate with the port 54 in the upper valve seat during heating, the ball port 52 will cooperate with the similar port 54 in the lower valve seat when the ball is shifted for the cooling operation control.

While in the above one practical embodiment of the invention has been disclosed, it will be understood that the details of construction shown and described are merely by way of illustration, and the invention may take other forms within the scope of the appended claims.

What is claimed is:

1. A temperature responsive valve comprising, a housing having means at opposite ends for connection to a fluid line, a pair of spaced, opposed, annular valve seats within the housing, the annular seats defining passages through the housing, a ball valve having its opposite sides seated in sealing relation in the valve seats, the ball having a port therethrough having open ends for registry with the passages through the housing, a helical, bi-metallic thermostat, a tube connected at one end to the ball and projecting therefrom, the tube having an opposite end connected to an end of the thermostat adjacent the ball, and a stem extending through the thermostat, tube and ball, the stem having one end fixed to the end of the thermostat remote from the ball and the other end fixed for rotational adjustment relative to the housing, the means for fixing the stem for rotatable adjustment including a wheel having a warming scale and a cooling scale marked thereon, the housing carrying a datum line, the warming and cooling scales on the wheel being so spaced that when the wheel is rotated from one scale to the other relative to the housing datum line the ball port open ends are moved to opposite sides of the respective annular seats for opening and closing association therewith, whereby the valve will operate in opposite phase when the wheel is moved from one scale to the other.

2. A temperature responsive valve as claimed in claim 1, wherein the stem end is held in positions of rotational adjustment by means of a spring biased wheel stop fixed to the housing and bearing against the wheel.

3. A temperature responsive valve as claimed in claim 1, wherein one of the annular valve seats has a port formed on its inner annular surface for registry with the open end of the ball port, and the valve seat having the port is rotatable about its own central axis to vary the extent of registration of the ball port and seat port to vary the capacity of the valve.

4. A temperature responsive valve as claimed in claim 3, wherein the port in the ball is of smaller cross-sectional area than the passages in the annular seats.

(References on following page)

References Cited in the file of this patent

UNITED STATES PATENTS

| | | |
|---|---|---|
| 1,236,257 | Broomell | Aug. 7, 1917 |
| 1,948,659 | Giesler | Feb. 27, 1934 |
| 2,199,416 | Paulson | May 7, 1940 |
| 2,296,917 | Garrett et al. | Sept. 29, 1942 |
| 2,519,266 | Main | Aug. 15, 1950 |
| 2,559,253 | Lingen et al. | July 3, 1951 |
| 2,769,456 | Atkinson | Nov. 6, 1956 |
| 3,041,036 | McFarland | June 26, 1962 |

FOREIGN PATENTS

| | | |
|---|---|---|
| 509,319 | Great Britain | July 13, 1939 |
| 738,582 | Great Britain | Oct. 19, 1955 |